United States Patent
Snyder

(10) Patent No.: US 7,715,970 B2
(45) Date of Patent: May 11, 2010

(54) FIFTH WHEEL SLIDE INTERLOCK

(75) Inventor: Christopher D. Snyder, Schnecksville, PA (US)

(73) Assignee: Mack Trucks, Inc., Allentown, PA (US)

( * ) Notice: Subject to any disclaimer, the term of this patent is extended or adjusted under 35 U.S.C. 154(b) by 46 days.

(21) Appl. No.: 12/158,746

(22) PCT Filed: Dec. 27, 2005

(86) PCT No.: PCT/US2005/047112
§ 371 (c)(1),
(2), (4) Date: Jun. 23, 2008

(87) PCT Pub. No.: WO2007/075165
PCT Pub. Date: Jul. 5, 2007

(65) Prior Publication Data
US 2009/0024285 A1    Jan. 22, 2009

(51) Int. Cl.
G06F 7/00    (2006.01)

(52) U.S. Cl. .................................................. 701/81

(58) Field of Classification Search .................. 701/36, 701/49, 50, 53, 81, 124; 180/271, 273
See application file for complete search history.

(56) References Cited

U.S. PATENT DOCUMENTS

| | | | |
|---|---|---|---|
| 4,429,892 A | | 2/1984 | Frampton et al. |
| 6,384,716 B1 | * | 5/2002 | Eckelberry .................. 340/431 |
| 7,156,410 B1 | | 1/2007 | Maskaleris et al. |
| 2002/0030341 A1 | * | 3/2002 | Eckelberry et al. ....... 280/149.2 |

OTHER PUBLICATIONS

PCT International Search Report, mailed Feb. 25, 2008, in connection with International Application No. PCT/US2005/047112.
PCT Written Opinion, mailed Feb. 25, 2008, in connection with International Application No. PCT/US2005/047112.
PCT International Preliminary Report on Patentability, mailed Jul. 10, 2008, in connection with International Application No. PCT/US2005/047112.

* cited by examiner

*Primary Examiner*—Kim T Nguyen
(74) *Attorney, Agent, or Firm*—Potomac Patent Group PLLC

(57) ABSTRACT

A speed interlock can prevent a sliding fifth wheel on a vehicle from being unlocked while the vehicle is moving faster than a threshold speed. A processor, such as the vehicle's electronic control unit, advantageously monitors the vehicle speed and a switch that controls the fifth wheel slide, preventing the fifth wheel from being unlocked if the vehicle speed is above a threshold.

15 Claims, 2 Drawing Sheets

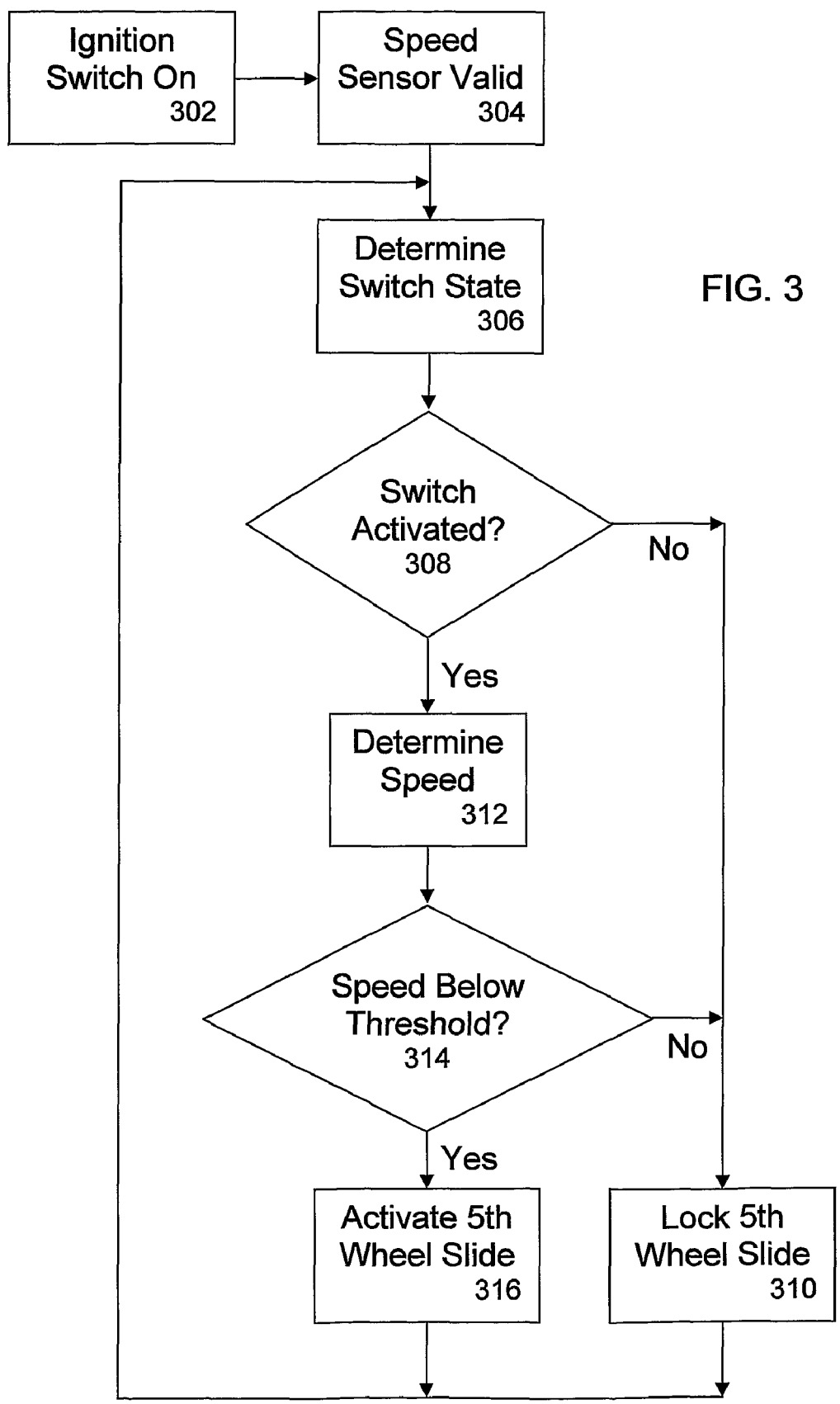

FIFTH WHEEL SLIDE INTERLOCK

BACKGROUND

This invention relates to systems and methods of controlling a vehicle, especially a heavy vehicle such as a highway truck or a tractor, in particular by controlling the vehicle's fifth wheel.

Over-the-highway trucks and tractor-trailer combinations come in many different sizes and configurations, and the relative geometry of the tractor and trailer in a load-carrying vehicle such as a class-8 tractor-trailer combination can vary widely. For example, the distribution of a tractor-trailer's weight on its axles can vary based on, among other factors, the position of a "fifth wheel" with respect to the cab of the tractor. A "fifth wheel" is generally a wheel or portion of a wheel placed horizontally over the rear axle or axles of a tractor or truck that is a coupling for a trailer.

FIG. 1 is a side view of a typical tractor 100 having a cab 102, front wheels and axle 104, a pair of rear wheels and axles 106, and a fifth wheel 108. Some tractors have sliding fifth wheels, which can be used to manage vehicle weight distribution by moving the trailer closer to or farther from the tractor. For example, U.S. Pat. No. 4,429,892 to Frampton et al. describes a device for attachment to a tractor for selectively moving the fifth wheel assembly of the tractor. The device has two drive members that can be extended or contracted from the cab of the tractor to slide the fifth wheel back and forth.

For safety, the fifth wheel should not be permitted to slide when the vehicle is moving. U.S. Pat. No. 6,384,716 to Eckelberry describes a trailer slider positioning alarm. The slider (fifth wheel) is locked in place with a set of pins. A speed sensor detects a speed of the unit and a pin position sensor detects whether any of the pins are unlocked. An alarm sends an alert signal in response to the speed sensor's detection of a predetermined speed and the pin position sensor's detection of at least one unlocked pin.

Some sliding fifth wheels, like other truck components, are actuated by pneumatic pressure that is controlled from the dash in the cab of the tractor. Actuating a switch on the dash locks and unlocks the position of the fifth wheel. The fifth wheel slide lock may be activated by an electrically controlled air solenoid or similar device.

The pneumatic supply to a bank of air solenoids, including the fifth wheel slide solenoid, usually uses a common feed. Because the air supply is shared by other truck components, a pneumatic interlock cannot be provided for the fifth wheel slide and so the fifth wheel slide can be released at any vehicle speed simply by activating the slide switch on the dash of the truck. If the fifth wheel slide is released while the vehicle is moving, the truck or trailer fifth wheel components could be damaged.

SUMMARY

A vehicle speed interlock can be used to prevent the fifth wheel slide from being unlocked while the vehicle is moving.

In one aspect of this invention, there is provided a system for controlling a position of a fifth wheel for a vehicle. The system includes a sensor configured to provide an indication of a speed of the vehicle; a switch actuatable to unlock the position of the fifth wheel; and a processor configured to receive the indication of the speed of the vehicle and an indication of a state of the switch. If the vehicle's speed is below a threshold and the switch is actuated to unlock the fifth wheel, the processor generates a control signal that enables the fifth wheel to be unlocked; and if the speed is above the threshold and the switch is actuated to unlock the fifth wheel, the processor generates a control signal that prevents the fifth wheel from being unlocked.

In another aspect of this invention, there is provided a method of controlling a position of a fifth wheel on a vehicle. The method includes the steps of determining a state of a switch that is actuatable to unlock the position of the fifth wheel; if the state of the switch is actuated to unlock the position of the fifth wheel, then determining a speed of the vehicle; if the speed is below a threshold and the state of the switch is actuated to unlock the position of the fifth wheel, then unlocking the position of the fifth wheel; if the speed is below the threshold and the state of the switch is not actuated to unlock the position of the fifth wheel, then not unlocking the position of the fifth wheel; and if the speed is above the threshold, then not unlocking the position of the fifth wheel.

In still another aspect of this invention, there is provided a computer-readable medium containing a computer program for controlling a position of a fifth wheel on a vehicle. The computer program carries out the steps of determining a state of a switch that is actuatable to unlock the position of the fifth wheel; if the state of the switch is actuated to unlock the position of the fifth wheel, then determining a speed of the vehicle; if the speed is below a threshold and the state of the switch is actuated to unlock the position of the fifth wheel, then unlocking the position of the fifth wheel; if the speed is below the threshold and the state of the switch is not actuated to unlock the position of the fifth wheel, then not unlocking the position of the fifth wheel; and if the speed is above the threshold, then not unlocking the position of the fifth wheel.

BRIEF DESCRIPTION OF THE DRAWINGS

The various features, objects, and advantages of this invention will be understood by reading this description in conjunction with the drawings, in which:

FIG. 3 is a flow chart of a method of controlling a fifth wheel.

DETAILED DESCRIPTION

The following description is in terms of a highway truck simply for convenience, and it will be understood that this invention is not limited to such trucks.

This application recognizes that a speed interlock can prevent a sliding fifth wheel from being unlocked while a vehicle is moving faster than a threshold speed. A vehicle's electronic control unit (ECU) advantageously monitors the vehicle speed and the dash switch that controls the fifth wheel slide. In many modern vehicles, the engine is readily controlled through execution of suitable program instructions by the ECU or a similar electronic processor, which receives input data values, carries out program steps using the input data, and provides output data values to appropriate vehicle systems, such as fuel injectors, ignition timing, engine and wheel brakes, etc.

Figure 1:
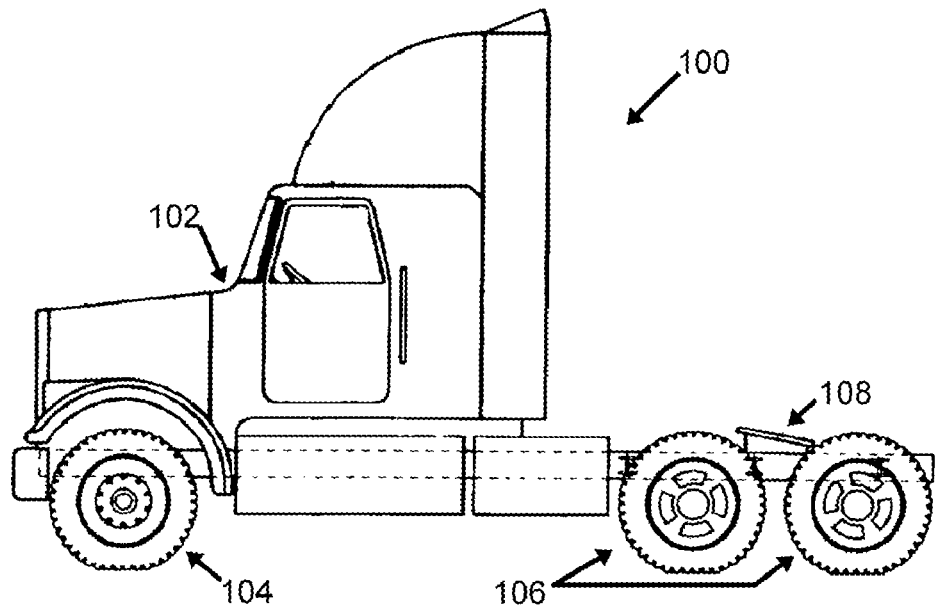
FIG. 1 is a side view of a tractor having a fifth wheel.
Figure 2:
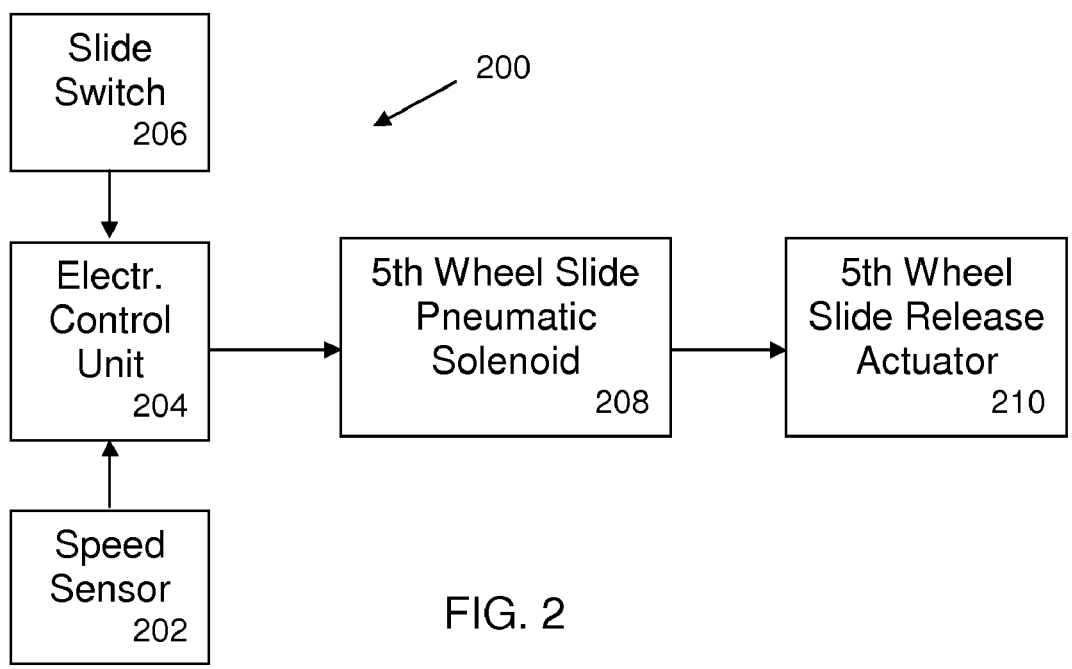
FIG. 2 is a block diagram of control system for a fifth wheel.

FIG. 2 is a block diagram of a suitable system 200 for controlling a sliding fifth wheel 108. A suitable sensor 202 provides speed data, either measured or computed, to an ECU 204. For example, the speed sensor 202 may sense the rotational speed of the vehicle's drive shaft or other components in the transmission of the vehicle. A suitable speed sensor 202 is a magnetic induction sensor, although other types can also be used. The ECU 204 also receives an indication of the state or position of a sliding fifth wheel dash switch 206, which may be a "hold" switch rather than a toggle switch. If the dash switch 206 is activated to unlock the sliding fifth wheel 108 and the vehicle's speed is above a threshold, the ECU acts such that the slide is not released. As described in more detail below, the sliding fifth wheel 108 can be released only when the vehicle's speed is below a threshold.

For example, the ECU or other suitable processor is programmed such that if the vehicle's speed is below a threshold and the dash switch 206 is activated, a solenoid 208 or other device that controls air for the sliding fifth wheel 108 is activated by an output of the ECU 204. In many vehicles, activation of the solenoid 208 causes an actuator 210 to release the sliding fifth wheel 108, but it will be appreciated that the details of this arrangement are not important to this invention. In response to the signal from the ECU 204 or other processor, the sliding fifth wheel 108 is released and the position of the fifth wheel can be changed.

In general, if the vehicle's speed is above the threshold, which may be about three kilometers/hour (KPH) for example. the ECU 204 is programmed such that it generates a signal that deactivates the fifth wheel solenoid 208 regardless of the position or state of the dash switch 206. Thus, the fifth wheel is locked in position and cannot be released. It may be noted that different thresholds can be provided for locking and unlocking the position of the fifth wheel, and such hysteresis could be used to provide a greater safety margin for when a vehicle begins to move, but hysteresis is not necessary. Moreover, a threshold higher than 3 KPH may be used.

If the solenoid 208 and actuator 210 have been deactivated because the vehicle speed was above the threshold and the speed has decreased below the threshold and the fifth wheel slide switch 206 is still applied, it is currently believed to be advantageous for the solenoid 208 and actuator 210 to remain deactivated until the switch 206 has been toggled off and back on. Thus, the fifth wheel position can be changed only if the vehicle speed is below the threshold and the switch 206 is activated.

It will be understood that if the vehicle speed signal is faulty or lost, the system 200 operates such that the fifth wheel position cannot be unlocked. This arrangement is currently believed to be preferable to an arrangement in which the threshold is such that the truck can be moved at lower speed to change the slide position. One advantage of the preferable arrangement is that inability to unlock the slide, e.g., due to a faulty or tampered-with speed sensor 202, is a strong inducement to maintain and repair the speed sensor.

The ECU 204 is advantageously programmed to test the speed sensor 202 and thereby determine whether the sensor readings are valid. The ECU 204 can electrically test whether the sensor has failed, e.g., as an electrical short or open circuit. The ECU 204 can also determine whether the sensor 202 has been tampered with. One exemplary way this can be done is by comparing speed values generated by the sensor 202 with speed values measured by other devices on the vehicle, e.g., an anti-lock brake system.

It will thus be understood that the system 200 prevents the fifth wheel from being unlocked if the vehicle speed is above a threshold. If the slide is unlocked and the vehicle starts to move too fast, the slide is locked. It is currently believed that the programming of the ECU 204 should permit the speed-sensitive locking to be disabled, for example by setting one or more parameters. Moreover, the ECU 204 may be programmed to set a fault code and monitor one or more other sensors of the vehicle speed in a suitable fallback mode.

FIG. 3 is a flow chart of a method of controlling a fifth wheel that may be carried out by execution of suitable program instructions by the ECU 204 or a similar processor. It will be recognized that the illustrated steps may be carried out in the order depicted or in a different order, and FIG. 3 depicts two optional initialization steps. In step 302, the vehicle's engine ignition switch should be on, rather than off, and in step 304, the speed sensor 202 should be verified as delivering valid measurements. If either of these conditions is not true, then it is currently believed to be preferable that the slide is not released.

In step 306, the state or position of the sliding fifth wheel dash switch 206 is determined. If the dash switch 206 is not activated (No in step 308), the ECU acts such that the slide is not released (step 310), for example by not activating the solenoid 208 or other device that controls air for the sliding fifth wheel 108. If the dash switch 206 is activated (Yes in step 308), the speed of the vehicle is determined (step 312), for example by sensing the speed or a parameter that can be used to compute the speed. If the speed is above the threshold (No in step 314), the ECU acts such that the slide is not released (step 310). If the vehicle's speed is below the threshold and the dash switch 206 is activated (Yes in step 314), the solenoid 208 or other device that controls air for the sliding fifth wheel 108 is activated by an output of the ECU 204 (step 316) so that the position of the fifth wheel can be changed.

It is expected that this invention can be implemented in a wide variety of environments, including for example trucks and other vehicles. It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electro-magnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

It is emphasized that the terms "comprises" and "comprising", when used in this application, specify the presence of stated features, integers, steps, or components and do not preclude the presence or addition of one or more other features, integers, steps, components, or groups thereof.

Thus, this invention may be embodied in many different forms, not all of which are described above, and all such forms are contemplated to be within the scope of the invention. The particular embodiments described above are merely illustrative and should not be considered restrictive in any way. The scope of the invention is determined by the following claims, and all variations and equivalents that fall within the range of the claims are intended to be embraced therein.

What is claimed is:

1. A system for controlling a position of a fifth wheel for a vehicle, comprising:
   a sensor configured to provide an indication of a speed of the vehicle;
   a switch actuatable to unlock the position of the fifth wheel, enabling the fifth wheel to slide closer to or farther from a cab of the vehicle; and
   a processor configured to receive the indication of the speed of the vehicle and an indication of a state of the switch;
   wherein if the speed is below a threshold and the switch is actuated to unlock the fifth wheel, the processor generates a control signal that enables the fifth wheel to be unlocked; and if the speed is above the threshold and the switch is actuated to unlock the fifth wheel, the processor generates a control signal that prevents the fifth wheel from being unlocked.

2. The system of claim 1, wherein the sensor provides an indication of a rotational speed of a drive shaft of the vehicle.

3. The system of claim 1, wherein the switch actuates a device that controls a pressurized air supply for the fifth wheel.

4. The system of claim 3, wherein if the speed is above the threshold, the processor generates a signal that deactivates the device that controls the pressurized air supply regardless of the state of the switch.

5. The system of claim 1, wherein if the speed decreases below the threshold and the switch is still actuated to unlock the fifth wheel, the processor causes the fifth wheel to remain locked until the switch is toggled off and back on.

6. A method of controlling a position of a fifth wheel on a vehicle, comprising the steps of:
   determining a state of a switch that is actuatable to unlock the position of the fifth wheel, enabling the fifth wheel to slide closer to or farther from a cab of the vehicle;
   if the state of the switch is actuated to unlock the position of the fifth wheel, then determining a speed of the vehicle;
   if the speed is below a threshold and the state of the switch is actuated to unlock the position of the fifth wheel, then unlocking the position of the fifth wheel;
   if the speed is below the threshold and the state of the switch is not actuated to unlock the position of the fifth wheel, then not unlocking the position of the fifth wheel; and
   if the speed is above the threshold, then not unlocking the position of the fifth wheel.

7. The method of claim 6, wherein the speed is determined by sensing a rotational speed of a drive shaft of the vehicle.

8. The method of claim 6, wherein unlocking the position of the fifth wheel comprises actuating a device that controls a pressurized air supply for the fifth wheel.

9. The method of claim 8, wherein if the speed is above the threshold, the device that controls the pressurized air supply is deactivated regardless of the state of the switch.

10. The method of claim 6, wherein if the speed decreases below the threshold and the switch is still actuated to unlock the fifth wheel, keeping the fifth wheel position not unlocked until the switch is toggled off and back on.

11. A computer-readable medium containing a computer program for controlling a position of a fifth wheel on a vehicle, the computer program carrying out the steps of:
   determining a state of a switch that is actuatable to unlock the position of the fifth wheel, enabling the fifth wheel to slide closer to or farther from a cab of the vehicle;
   if the state of the switch is actuated to unlock the position of the fifth wheel, then determining a speed of the vehicle;
   if the speed is below a threshold and the state of the switch is actuated to unlock the position of the fifth wheel, then unlocking the position of the fifth wheel;
   if the speed is below the threshold and the state of the switch is not actuated to unlock the position of the fifth wheel, then not unlocking the position of the fifth wheel; and
   if the speed is above the threshold, then not unlocking the position of the fifth wheel.

12. The computer-readable medium of claim 11, wherein the speed is determined by sensing a rotational speed of a drive shaft of the vehicle.

13. The computer-readable medium of claim 11, wherein unlocking the position of the fifth wheel comprises actuating a device that controls a pressurized air supply for the fifth wheel.

14. The computer-readable medium of claim 13, wherein if the speed is above the threshold, the device that controls the pressurized air supply is deactivated regardless of the state of the switch.

15. The computer-readable medium of claim 11, wherein if the speed decreases below the threshold and the switch is still actuated to unlock the fifth wheel, keeping the fifth wheel position locked until the switch is toggled off and back on.

* * * * *